United States Patent
Kazda

[19]

[11] Patent Number: 6,135,679
[45] Date of Patent: Oct. 24, 2000

[54] THREAD-CUTTING CHUCK USING A MINIMUM AMOUNT OF LUBRICATION

[75] Inventor: Thomas Kazda, Hartenstein, Germany

[73] Assignee: Emuge-Werk Richard Glimpel Fabrikfuer Praezisionswerkzeuge vormals Moschkau & Glimpel, Lauf, Germany

[21] Appl. No.: 09/305,508

[22] Filed: May 5, 1999

[30] Foreign Application Priority Data

May 12, 1998 [DE] Germany .......................... 198 21 186

[51] Int. Cl.[7] .................................................. B23B 51/06
[52] U.S. Cl. .................................. 408/57; 279/20; 408/59
[58] Field of Search ................. 279/20; 408/57, 408/59

[56] References Cited

U.S. PATENT DOCUMENTS

| | | | |
|---|---|---|---|
| 4,396,317 | 8/1983 | Staron et al. | 408/59 |
| 4,640,652 | 2/1987 | Rivera, Jr. | 279/20 |
| 5,076,740 | 12/1991 | Petrie | 408/59 |

FOREIGN PATENT DOCUMENTS

| | | | |
|---|---|---|---|
| 464335 | 1/1992 | European Pat. Off. | 279/20 |
| 2435188 | 2/1976 | Germany | 279/20 |
| 4218237 | 12/1993 | Germany . | |

*Primary Examiner*—Steven C. Bishop
*Attorney, Agent, or Firm*—Jōrdan and Hamburg LLP

[57] ABSTRACT

A thread-cutting chuck for use with minimum amounts of lubrication includes an axially central lubricant channel for connecting an insert sleeve for reception of a collet chuck, especially a quick-change insert, which accommodates a screw tap provided with a longitudinal borehole, with a minimum lubrication source on the machine side, from which the lubricant is passed as an aerosol to the longitudinal borehole of the screw tap. An axially displaceable coolant pipe which brings about a direct connection with the longitudinal borehole of the screw tap is provided in the lubricant channel extending into the junction region leading into the insert sleeve. The coolant pipe extends in one piece continuously from the screw tap up to the lubricant supplying channel of the chuck shaft, and is mounted displaceably in the insert sleeve of the collet chuck, and due to the pressure of the aerosol acting on its inner end surface, is pressed, independently of the axial position of the screw tap, into an engagement position with an end of the screw top such that it is communicative with the longitudinal borehole of the screw tap.

11 Claims, 1 Drawing Sheet

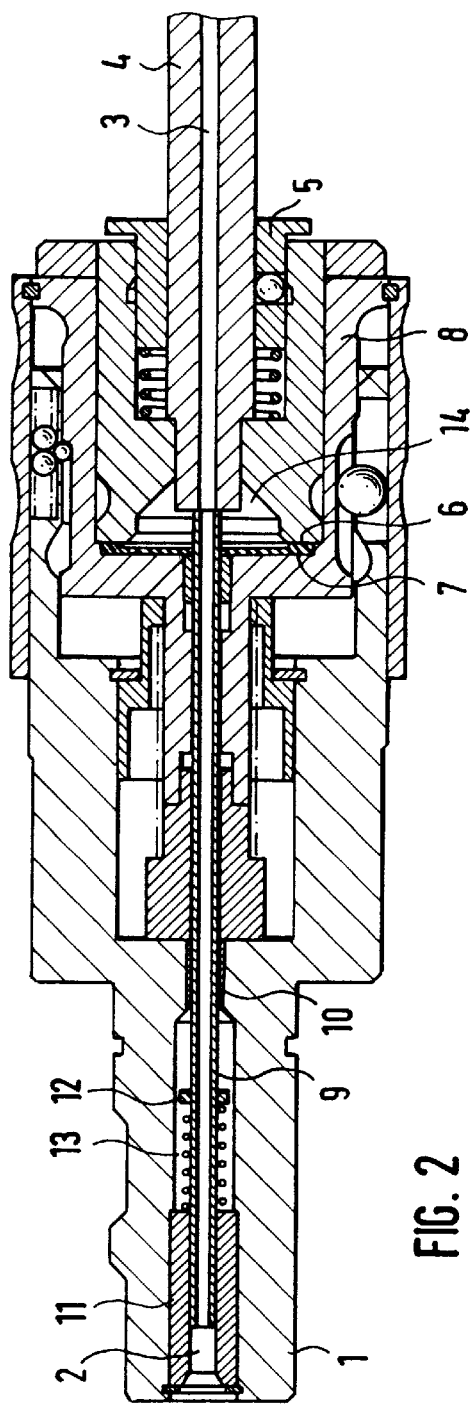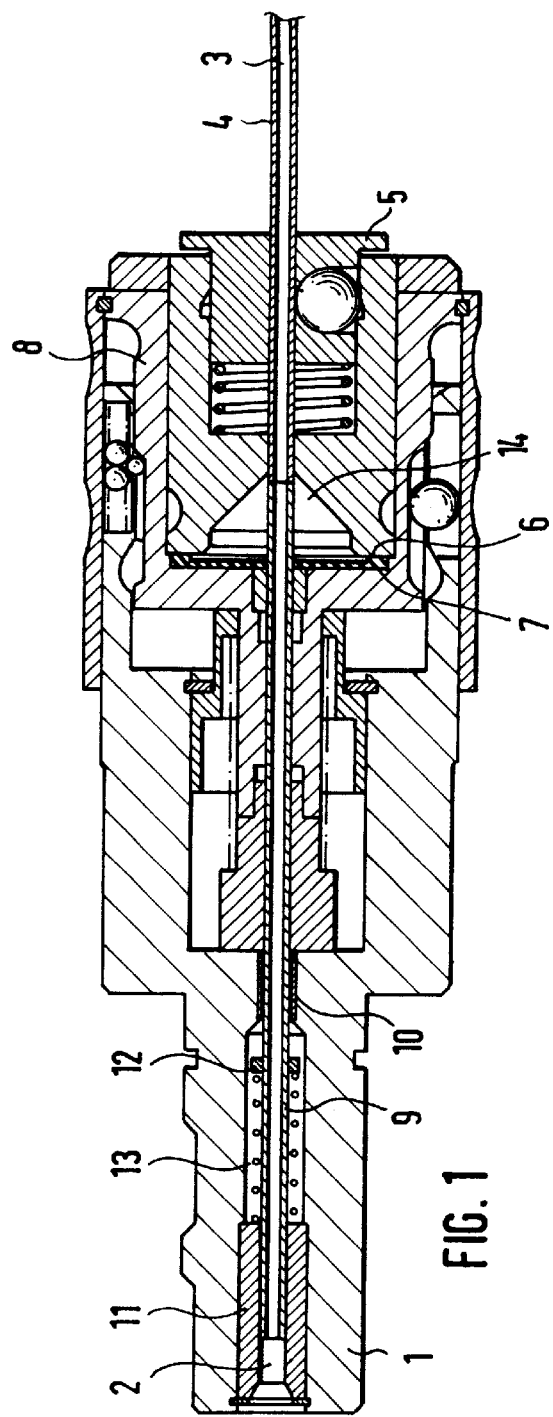

THREAD-CUTTING CHUCK USING A MINIMUM AMOUNT OF LUBRICATION

BACKGROUND OF THE INVENTION

The present invention relates to a thread-cutting chuck which operates with minimum amounts of lubrication having an axially central lubricant channel for connecting an insert sleeve for the collet chuck, particularly a quick-change insert, which accommodates a screw tap that is provided with a longitudinal borehole, with a minimum lubrication source on a machine side, from which the lubricant is passed as an aerosol to the longitudinal borehole of the screw tap, and wherein the lubricant channel, in the junction region leading into the insert sleeve, comprises an axially displaceable coolant pipe which brings about a direct connection with the longitudinal borehole of the screw tap.

Known thread-cutting chucks in which an aerosol of the cooling lubricant, which is dispersed finely in the compressed air, serves to cool the thread-cutting site, as well as to lubricate the thread-cutting tap in the threaded borehole that is to be cut, are presently on the market in various embodiments. With such a thread-cutting chuck, the difficulty exists that screw taps of different sizes must be used, which protrude inwardly in each case to a different extent. This results in chambers of undefined size behind the screw tap. In these chambers, the danger exists that, due to turbulence, the aerosol will demix from the transporting compressed air. The droplets of cooling lubricant, which are required to be very finely dispersed, can ball together into large drops, in which case the cooling and lubricating effects are no longer provided to the degree desired.

German patent DE 42 18 237 A1 discloses a thread-cutting chuck of the type described above, in which, by providing a coolant pipe, a direct connection to the longitudinal borehole of the screw tap is possible without having to form a chamber between the pipe end and the screw tap. The sealing connection is accomplished in the disclosed thread-cutting chuck by way of a displaceable connecting piece which is at the end of the coolant pipe and can lie elastically against the screw tap. This known arrangement is, however, not suitable for aerosol lubrication since the coolant pipe protrudes at the inner end into a chamber, in which demixing of the aerosol would inevitably take place. In addition, such demixing would likely also occur at the connecting piece because of the differently expanding diameters present. Moreover, this type of sealing arrangement for the coolant at the end of the screw tap is suitable only for a particular axial position of the screw tap and not for a thread-cutting chuck with quick-change exchangeable inserts, for which the end surface of the screw tap is positioned axially at very different positions for drills of different thicknesses. The slight contact pressure springiness in the case of the aforementioned thread-cutting chuck disclosed in DE 42 18 237 A1 is neither intended for nor suitable for such axial positional displacements of the end of the screw tap.

SUMMARY OF THE INVENTION

It is therefore an object of the invention to provide a thread-cutting chuck of the above mentioned type having a suitable configuration such that when different quick-change inserts with axially different positioning of the ends of the screw tap are used, turbulence with the attendant danger of demixing of the aerosol is reliably prevented.

In accordance with these and other objects of the invention, a thread-cutting chuck is provided in which a coolant pipe extends as one piece continuously from a screw tap up to a lubricant supplying channel formed in a chuck shaft. The coolant pipe is mounted displaceably in an insert sleeve for a collet chuck, provided particularly in the form of a quick-change insert. Due to the pressure of the aerosol acting on the inner end surface of the coolant pipe, the coolant pipe is pressed, independently of the axial position of the screw tap, into an engagement position in which an end portion of the coolant pipe engages an end portion of the screw tap with the coolant pipe in communication with the longitudinal borehole of the screw tap.

In some cases, especially when the coolant pipe has only a very slight wall thickness, as would be suitable for the actual turbulence-free transport, the advancing force, which can be applied over the small end surface of the coolant pipe, is so slight, that it is not even able to overcome internal frictions. For this reason, it has proven to be advantageous to prestress, i.e. bias, the coolant pipe towards the outside by means of a spring.

In this regard, a development has turned out to be particularly simple and advantageous, in accordance with which a spirally coiled compression spring surrounding the coolant pipe is supported at one end at a rear guiding bearing bushing and, on the other, at a ring wheel which is fastened to the coolant pipe.

This construction, moreover, has the additional advantage that the ring wheel, together with a front guiding bearing bushing, forms a pull-out limit for the coolant pipe. When the quick-change chuck is not used, the coolant pipe, with a screw tap, is pressed forward by the spring into its maximum pull-out position. When the quick-change insert is used with a screw tap, the coolant pipe, depending on the axial position of the screw tap, is forced more or less inward, but always maintains a direct connection with the longitudinal borehole of the screw tap and, in this manner, avoids turbulences of the coolant lubricant that result in demixing in the chamber behind the screw tap.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a cross-sectional side view of a quick-change chuck in accordance with an embodiment of the invention shown with a screw tap of small diameter received therein; and FIG. 2 is a cross-sectional side view of the thread-cutting chuck of FIG. 1 shown with a larger screw tap, which extends axially further towards the rear, received therein.

DETAILED DESCRIPTION OF THE INVENTION

Referring now to FIGS. 1 and 2, a thread cutting chuck includes a chuck shaft 1 within which a coolant and lubricant channel 2 is formed, and which serves for the connection to a minimum lubrication source located on a machine side (not shown). The coolant and lubricant channel 2 is intended to establish a connection between the minimum lubrication source and a longitudinal borehole 3 of a screw tap 4, the screw tap 4 being shown clamped in a quick-change insert 5. An inner end edge 6 of the quick change insert 5 lies against a sealing ring 7 of an insert sleeve 8 of the quick-change insert 5. A thin-walled coolant pipe 9 is mounted axially, longitudinally displaceable within the coolant and lubricant channel 2. For this purpose, the coolant and lubricant channel 2 is partially provided with constrictions or inserts, which form guiding bearing bushings that tightly surround the coolant pipe. For example, as shown in the figures, a front guiding bearing bushing 10 and a rear guiding bearing bushing 11, formed by an insert, are provided. A ring wheel 12 is fastened on the coolant pipe 9 between the two guiding bearing bushings 10, 11, on which the front end of a spirally coiled compression spring 13 is supported. The rear end of the spirally coiled compression spring 13 is supported at the real guiding bearing bushing 11. By means of this spirally coiled compression spring 13, the coolant pipe 9 is forwardly biased, so that it is in a more or less tight engagement with the end of the screw tap 4, such that the coolant pipe 9 is in aligned communication with the longitudinal borehole 3 of the screw tap 4 and, moreover, such engagement is achieved independently of a particular axial position which the rear end of the screw tap 4 occupies. A continuous pipe connection is produced from the rear end of the chuck shaft, and with that, from the connecting pipe to the minimum lubricating source up to the threaded borehole 3 of the screw tap 4, regardless of whether a thick screw tap, as shown in FIG. 2, or a thin screw tap, as shown in FIG. 1 and which ends further forward than the thick screw tap of FIG. 2, is received in the thread-cutting chuck. Accordingly, in the space 14 of smaller or greater size behind the inner end walls of the screw tap 4, turbulences resulting in a demixing of the aerosol cannot occur. Instead, the aerosol is passed as a fine emulsion from the minimum lubricating source to the front end of the screw tap 4. The ring wheel 12, in conjunction with the front guiding bearing bushing 10, functions in this regard as a pull-out limit for the coolant pipe 9. If a quick-change insert has not been inserted into the chuck shaft, the coolant pipe 9 is in a position which is shifted furthest to the outside and in which the ring wheel 12 lies against the guiding bearing bushing 10. If a quick-change insert is used with a screw tap of any diameter, the inner end of the screw tap pushes the coolant pipe 9 a correspondingly distance to the rear, i.e., either into the position of FIG. 1 or the intermediate position of FIG. 2, or any other intermediate position.

What is claimed is:

1. A thread-cutting chuck in which a collet chuck is receivable, the collet chuck accommodating a screw tap having a longitudinal borehole for operation using minimum amounts of lubrication and in which a lubricant is supplied as an aerosol from a minimum lubrication source on a machine side, the thread-cutting chuck comprising:

an insert sleeve for receiving the collet chuck;

a chuck shaft including an axially central lubricant supplying channel communicative with the insert sleeve through which the lubricant is passed to the longitudinal borehole of the screw tap;

a coolant pipe extending in one piece continuously from the screw tap up to the lubricant supplying channel of the chuck shaft, said coolant pipe being mounted displaceably in the insert sleeve for reception of the collet chuck, the coolant pipe being axially displaceable in response to a pressure of the aerosol acting on an inwardly facing end surface of the coolant pipe, whereby as pressure of the aerosol is introduced from the minimum lubrication source, the coolant pipe is pressed into an engagement position in which an end of the coolant pipe is engaged with an end of the screw tap such that the coolant pipe is in aligned communication with the longitudinal borehole of the screw tap independently of a particular axial position of the screw tap.

2. The thread-cutting chuck according to claim 1, wherein the collet chuck is provided in the form of a quick-change insert.

3. The thread-cutting chuck according to claim 1, wherein the coolant pipe is biased in a direction of the screw tap by a spring.

4. The thread-cutting chuck of claim 1, wherein an inner diameter of the coolant pipe is approximately equal to an inner diameter of the longitudinal borehole of the screw tap.

5. The thread-cutting chuck of claim 3, wherein the coolant pipe is provided with minimal wall thickness to reduce turbulence.

6. The thread-cutting chuck of claim 1, wherein the end of the coolant pipe is in abutted engagement with the end of the screw tap when in the engagement position.

7. The thread-cutting chuck according to claim 1, wherein the coolant pipe is biased in a direction of the screw tap by a spring suitably located such that it does not contact a flow path of said aerosol.

8. A thread-cutting chuck in which a collet chuck is receivable, the collet chuck accommodating a screw tap having a longitudinal borehole for operation using minimum amounts of lubrication and in which a lubricant is supplied as an aerosol from a minimum lubrication source on a machine side, the thread-cutting chuck comprising:

an insert sleeve for receiving the collet chuck;

a chuck shaft including an axially central lubricant supplying channel communicative with the insert sleeve through which the lubricant is passed to the longitudinal borehole of the screw tap;

a coolant pipe extending in one piece continuously from the screw tap up to the lubricant supplying channel of the chuck shaft, said coolant pipe being mounted displaceably in the insert sleeve for reception of the collet chuck, the coolant pipe being axially displaceable in response to a pressure of the aerosol acting on an inwardly facing end surface of the coolant pipe, whereby as pressure of the aerosol is introduced from the minimum lubrication source, the coolant pipe is pressed into an engagement position in which an end of the coolant pipe is engaged with an end of the screw tap such that the coolant pipe is in aligned communication with the longitudinal borehole of the screw tap independently of a particular axial position of the screw tap, the coolant pipe being spring-biased in a direction of the screw tap;

a rear guiding bushing being disposed within the lubricant channel and surrounding the coolant pipe;

a ring wheel being carried on the coolant pipe; and a spirally coiled compression spring being disposed in a position surrounding said coolant pipe, said spirally coiled compression spring being supported at the rear guiding bearing bushing and at the ring wheel.

9. The thread-cutting chuck of claim 8, further comprising a front guiding bearing bushing having an inner diameter less than an outer diameter of the ring wheel, the ring wheel, together with the front guiding bearing bushing, forming a pull-out limit for the coolant pipe.

10. A thread-cutting chuck in which a collet chuck is receivable, the collet chuck accommodating a screw tap having a longitudinal borehole for operation using minimum amounts of lubrication and in which a lubricant is supplied as an aerosol from a lubrication source on a machine side, the thread-cutting chuck comprising:

an insert sleeve for receiving the collet chuck;

a chuck shaft including a lubricant supply channel communicative with the insert sleeve through which the lubricant is passed to the longitudinal borehole of the screw tap;

a coolant pipe extending from the screw tap to the lubricant supply channel of the chuck shaft, said coolant pipe being mounted displaceably in the insert sleeve for reception of the collet chuck, the coolant pipe being axially displaceable in response to a pressure of the aerosol acting on the coolant pipe, whereby as pressure of the aerosol is introduced from the lubrication source, the coolant pipe is pressed into an engagement position such that the coolant pipe is in aligned communication with the longitudinal borehole of the screw tap independently of a particular axial position of the screw tap.

11. The thread-cutting chuck according to claim 10, wherein the coolant pipe is biased in a direction of the screw tap by a spring suitably located such that it does not contact a flow path of said aerosol.

* * * * *